United States Patent
Lai et al.

(10) Patent No.: US 10,250,626 B2
(45) Date of Patent: Apr. 2, 2019

(54) ATTACKING NODE DETECTION APPARATUS, METHOD, AND NON-TRANSITORY COMPUTER READABLE STORAGE MEDIUM THEREOF

(71) Applicant: Institute For Information Industry, Taipei (TW)

(72) Inventors: Chia-Min Lai, New Taipei (TW); Ching-Hao Mao, Taipei (TW); Chih-Hung Hsieh, Taoyuan (TW); Te-En Wei, Taipei (TW); Chi-Ping Lai, Taichung (TW)

(73) Assignee: Institute For Information Industry, Taipei (TW)

( * ) Notice: Subject to any disclaimer, the term of this patent is extended or adjusted under 35 U.S.C. 154(b) by 152 days.

(21) Appl. No.: 15/372,235

(22) Filed: Dec. 7, 2016

(65) Prior Publication Data

US 2018/0159878 A1    Jun. 7, 2018

(30) Foreign Application Priority Data

Dec. 1, 2016    (TW) .............................. 105139679 A (51) Int. Cl.
*H04L 29/06* (2006.01)
*G06F 21/55* (2013.01)

(52) U.S. Cl.
CPC .......... *H04L 63/1425* (2013.01); *G06F 21/55* (2013.01); *H04L 63/1408* (2013.01);
(Continued)

(58) Field of Classification Search
CPC .......... G06F 21/55–21/556; G06F 2221/2135; H04L 63/1408–63/1425; H04L 63/1433; H04L 63/1441
See application file for complete search history.

(56) References Cited

U.S. PATENT DOCUMENTS

2002/0166063 A1    11/2002    Lachman, III et al.
2006/0010389 A1    1/2006    Rooney et al.
(Continued)

FOREIGN PATENT DOCUMENTS

| EP | 2009864 A1 | 12/2008 |
|---|---|---|
| TW | 200833015 A | 8/2008 |
| WO | 2016073457 A2 | 5/2016 |

OTHER PUBLICATIONS

Office Action to the corresponding Taiwan Patent Application No. 105139679 rendered by the Taiwan Intellectual Property Office (TIPO) dated Jul. 21, 2017, 17 pages (including English translation).
(Continued)

*Primary Examiner* — Kevin Bechtel
(74) *Attorney, Agent, or Firm* — Skaar Ulbrich Macari, P.A.

(57) ABSTRACT

An attacking node detection apparatus, method, and computer program product thereof are provided. The attacking node detection apparatus stores a plurality of access records of an application, wherein each access record includes a network address of a host and an access content. The attacking node detection apparatus filters the access records into a plurality of filtered access records according to a predetermined rule so that the access content of each filtered access record conforms to the predetermined rule. The attacking node detection apparatus creates at least one access relation of each of the network addresses according to the filtered access records, wherein each access relation is defined by one of the network addresses and one of the access contents. The attacking node detection apparatus identifies a specific network address as an attacking node according to the access relations.

17 Claims, 6 Drawing Sheets

(52) U.S. Cl.
CPC ...... *H04L 63/1433* (2013.01); *H04L 63/1441* (2013.01); *G06F 2221/2135* (2013.01)

(56) References Cited

U.S. PATENT DOCUMENTS

| | | | |
|---|---|---|---|
| 2009/0070872 | A1 | 3/2009 | Cowings et al. |
| 2009/0276389 | A1* | 11/2009 | Constantine ........... G06N 7/005 706/52 |
| 2012/0173710 | A1 | 7/2012 | Rodriguez |
| 2014/0283085 | A1 | 9/2014 | Maestas |
| 2016/0301704 | A1 | 10/2016 | Hassanzadeh et al. |
| 2016/0330236 | A1* | 11/2016 | Reddy ................. H04L 63/1466 |
| 2017/0026391 | A1 | 1/2017 | Abu-Nimeh |
| 2017/0063886 | A1* | 3/2017 | Muddu ............... H04L 63/1425 |

OTHER PUBLICATIONS

The extended European Search Report rendered by the European Patent Office for European Patent Application No. 16202638.9, dated Feb. 13, 2017, 7 pages.

Magnus Almgren et al., "A Lightweight Tool for Detecting Web Server Attacks", Internet citation 2000 XP002375914, retrieved from the internet: URL:http://www.isoc.org/isoc/conferences/ndss/2000/proceedings/007.pdf, retrieved on Apr. 5, 2006, 14 pages.

Jens Müller, "Web Application Forensics Implementation of a Framework for Advanced HTTPD Logfile Security Analysis", retrieved from the internet: URL:http://homepage.ruhr-uni-bochum.de/jens.mueller-2/publications/2012-web-application-forensics.pdf, retrieved on Jan. 27, 2017, dated Dec. 24, 2012, 68 pages.

Ching-Hao Mao et al., "EigenBot", Proceedings of the ACM SIGKDD Workshop on Intelligence and Security Informatics, ISI-KDD '12, Aug. 12, 2012, 8 pages.

The extended European Search Report rendered by the European Patent Office for European Patent Application No. 16202618.1, dated Feb. 13, 2017, 6 pages.

Li Wang et al., "Automatic Multi-step Attack Pattern Discovering", International Journal of Network Security, vol. 10, No. 2, pp. 142-152, retrieved from the internet: URL:http://ijns.femto.com.tw/contents/ijns-v10-n2/ijns-2010-v10-n2-p142-152.pdf, retrieved on Feb. 2, 2017, dated Mar. 2010, 6 pages.

Office Action to U.S. Appl. No. 15/372,294, whose inventors are the same as those of the subject patent application, rendered by the United States Patent and Trademark Office (USPTO) dated Oct. 2, 2018, 16 pages.

* cited by examiner

FIG. 1A

```
fcrawler.looksmart.com - - [26/Apr/2000:00:00:12 -0400] "GET /contacts.html HTTP/1.0" 200 4595 "-" "FAST-WebCrawler/2.1-pre2
(ashen@looksmart.net)"
fcrawler.looksmart.com - - [26/Apr/2000:00:17:19 -0400] "GET /news/news.html HTTP/1.0" 200 16716 "-" "FAST-WebCrawler/2.1-
pre2 (ashen@looksmart.net)"

ppp931.on.bellglobal.com - - [26/Apr/2000:00:16:12 -0400] "GET /download/windows/asctab31.zip HTTP/1.0" 200 1540096
"http://www.htmlgoodies.com/downloads/freeware/webdevelopment/15.html" "Mozilla/4.7 [en]C-SYMPA (Win95; U)"

123.123.123.123 - - [26/Apr/2000:00:23:48 -0400] "GET /pics/wpaper.gif HTTP/1.0" 200 6248 "http://www.jafsoft.com/asctortf/"
"Mozilla/4.05 (Macintosh; I; PPC)"
123.123.123.123 - - [26/Apr/2000:00:23:47 -0400] "GET /asctortf/ HTTP/1.0" 200 8130
"http://search.netscape.com/Computers/Data_Formats/Document/Text/RTF" "Mozilla/4.05 (Macintosh; I; PPC)"
123.123.123.123 - - [26/Apr/2000:00:23:48 -0400] "GET /pics/5star2000.gif HTTP/1.0" 200 4005
"http://www.jafsoft.com/asctortf/" "Mozilla/4.05 (Macintosh; I; PPC)"
123.123.123.123 - - [26/Apr/2000:00:23:50 -0400] "GET /pics/5star.gif HTTP/1.0" 200 1031 "http://www.jafsoft.com/asctortf/"
"Mozilla/4.05 (Macintosh; I; PPC)"
123.123.123.123 - - [26/Apr/2000:00:23:51 -0400] "GET /pics/a2hlogo.jpg HTTP/1.0" 200 4282 "http://www.jafsoft.com/asctortf/"
"Mozilla/4.05 (Macintosh; I; PPC)"
```

ATTACKING NODE DETECTION APPARATUS, METHOD, AND NON-TRANSITORY COMPUTER READABLE STORAGE MEDIUM THEREOF

PRIORITY

This application claims priority to Taiwan Patent Application No. 105139679 filed on Dec. 1, 2016, which is hereby incorporated by reference in its entirety.

FIELD

The present invention relates to an attacking node detection apparatus, method, and non-transitory computer readable storage medium thereof. More particularly, the present invention relates to an apparatus, a method, and a non-transitory computer readable storage medium thereof for detecting an attacking node by access records.

BACKGROUND

With rapid advancement of the science and technologies, computers and networks have become indispensable to government and enterprise's operations as well as people's daily life. For various kinds of purposes, hackers attack servers and/or computers on the networks. Generally speaking, attacks from the hackers may be divided into two categories, including destroying attacks and intrusion attacks. The destroying attacks aim at destroying the attacked targets so that the attacked targets fail to operate normally. The intrusion attacks aim at acquiring some authorities of the attacked targets so as to control the attacked targets to execute specific operations. The intrusion attacks are usually performed in the loopholes of servers, application software, or network communication protocols.

To prevent the computers on the network from being attacked by hackers, some conventional technologies adopt the filtering rules designed by experts. Specifically, the administrator uses a predetermined filtering list to filter the accessing apparatuses so as to maintain the information security. The filtering list may include Internet Protocol (IP) addresses to be filtered or feature values of program codes of malicious software. Nevertheless, the filtering list cannot be updated in real time and, hence, there is still a window that the maintenance of information security is vulnerable. Some conventional technologies adopt the mechanism of dynamic real-time scanning (e.g., scanning webpage contents), which shortens the window that the maintenance of information security is vulnerable but consumes a lot of computing resources. Accordingly, a technology capable of detecting node attacks to maintain the information security is still needed in the art.

SUMMARY

The disclosure includes an attacking node detection apparatus. The attacking node detection apparatus can comprise a storage unit and a processing unit, wherein the processing unit is electrically connected to the storage unit. The storage unit stores a plurality of access records of an application, wherein each of the access records comprises a network address of a host and an access content regarding the host accessing the application. The processing unit filters the access records into a plurality of filtered access records according to a predetermined rule, wherein the access content of each of the filtered access records conforms to the predetermined rule. The processing unit further creates at least one access relation for each of the network addresses according to the filtered access records, wherein each of the access relations is defined by one of the network addresses and one of the access contents. The processing unit further identifies a specific network address among the network addresses as an attacking node according to the access relations.

The disclosure further includes an attacking node detection method, which is adapted for an electronic computing apparatus. The electronic computing apparatus stores a plurality of access records of an application, wherein each of the access records comprises a network address of a host and an access content regarding the host accessing the application. The attacking node detection method can comprise the following steps of: (a) filtering the access records into a plurality of filtered access records according to a predetermined rule, wherein the access content of each of the filtered access records conforms to the predetermined rule, (b) creating at least one access relation of each of the network addresses according to the filtered access records, wherein each of the access relations is defined by one of the network addresses and one of the access contents, and (c) identifying a specific network address among the network addresses as an attacking node according to the access relations.

The disclosure also includes a non-transitory computer readable storage medium, which comprises a computer program stored therein. An electronic computing apparatus stores a plurality of access records of an application, wherein each of the access records comprises a network address of a host and an access content regarding the host accessing the application. When the computer program is loaded into the electronic computing apparatus, the computer program executes the attacking node detection method described above.

The attacking node detection technology (including the apparatus, method, and non-transitory computer readable storage medium thereof) provided in the present invention detects the network addresses that have abnormal behaviors (e.g., the number of access relations of a network address being greater than the predetermined threshold) by analyzing a plurality of access records of an application and identifies the network addresses that have abnormal behaviors as the first attacking nodes. Furthermore, the attacking node detection technology (including the apparatus, method, and non-transitory computer readable storage medium thereof) provided in the present invention identifies other nodes having behaviors similar to the first attacking nodes as the second attacking nodes. Through the aforesaid operations, the attacking node detection technology provided by the present invention can find out not only the highly-possible attacking nodes but also the potential attacking nodes. These attacking nodes are the attacking entry points where hackers may attack the application.

The detailed technology and preferred embodiments implemented for the subject invention are described in the following paragraphs accompanying the appended drawings for people skilled in this field to well appreciate the features of the claimed invention.

DETAILED DESCRIPTION

In the following description, an attacking node detection apparatus, method, and non-transitory computer readable storage medium thereof according to the present invention will be explained with reference to example embodiments thereof. However, these example embodiments are not intended to limit the present invention to any particular examples, embodiments, environment, applications, or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction. In addition, dimensions of individual elements and dimensional relationships among individual elements in the attached drawings are provided only for illustration but not to limit the scope of the present invention.

Figure 1A:
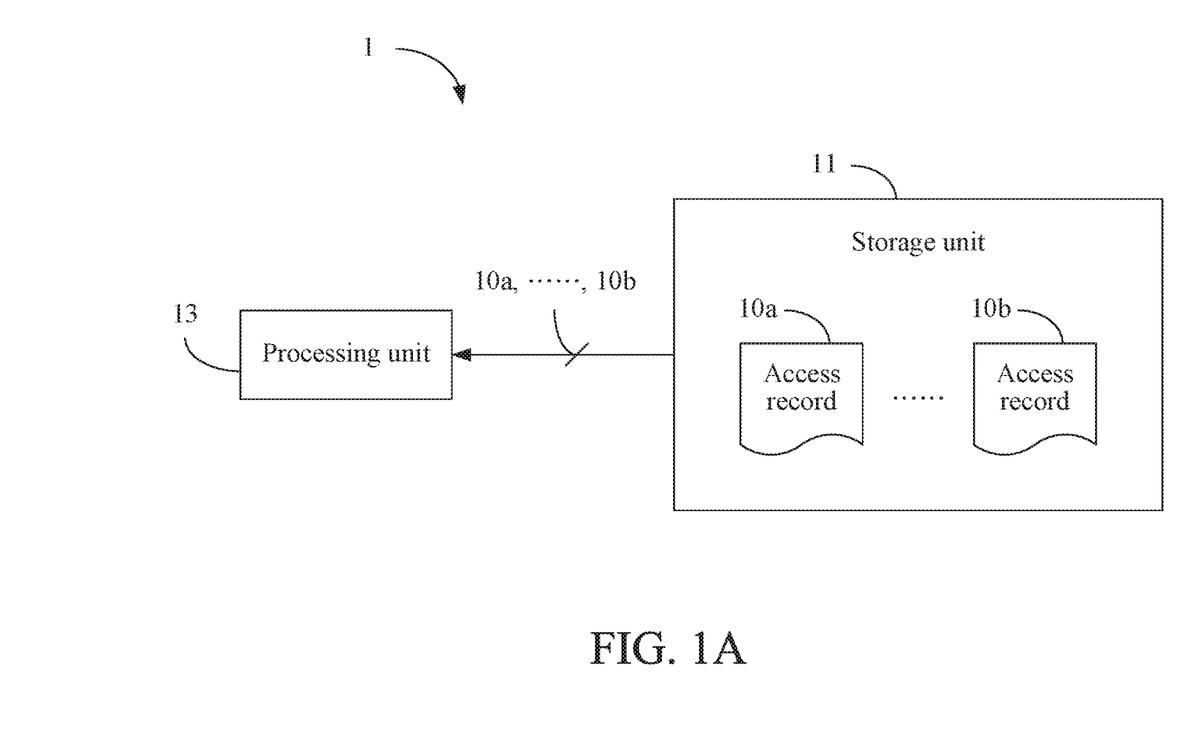
FIG. 1A illustrates a schematic view of an attacking node detection apparatus 1 of the first embodiment.

A first embodiment of the present invention is an attacking node detection apparatus 1 and a schematic view of which is depicted in FIG. 1A. The attacking node detection apparatus 1 comprises a storage unit 11 and a processing unit 13, wherein the processing unit 13 is electrically connected to the storage unit 11. The storage unit 11 may be a memory, a Universal Serial Bus (USB) disk, a hard disk, a Compact Disk (CD), a mobile disk, a magnetic disk, a database, or any other storage medium or circuit known to those of ordinary skill in the art and having the same functionality. The processing unit 13 may be any of various processors, Central Processing Units (CPUs), microprocessors or other computing apparatuses known to those of ordinary skill in the art.

The storage unit 11 stores a plurality of access records 10a, . . . , 10b (i.e., access records regarding other hosts access the application) of an application (e.g., a website server application). The application may be installed in the attacking node detection apparatus 1 or other network nodes in a network system. Each of the access records 10a, . . . , 10b comprises a network address of a host and an access content regarding the host accessing the application. In some embodiments, each of the access contents may be a Hyper-Text Transfer Protocol (HTTP) request, an access status code, and/or a data access amount. It shall be appreciated that the content of an HTTP request is well known to those of ordinary skill in the art, so the details are not described herein. Additionally, an access status code comprised in an access record represents the result of the access (e.g., successful access, failed success, webpage not found). Furthermore, a data access amount in an access record represents the data amount downloaded by the host during the access.

Figure 1B:
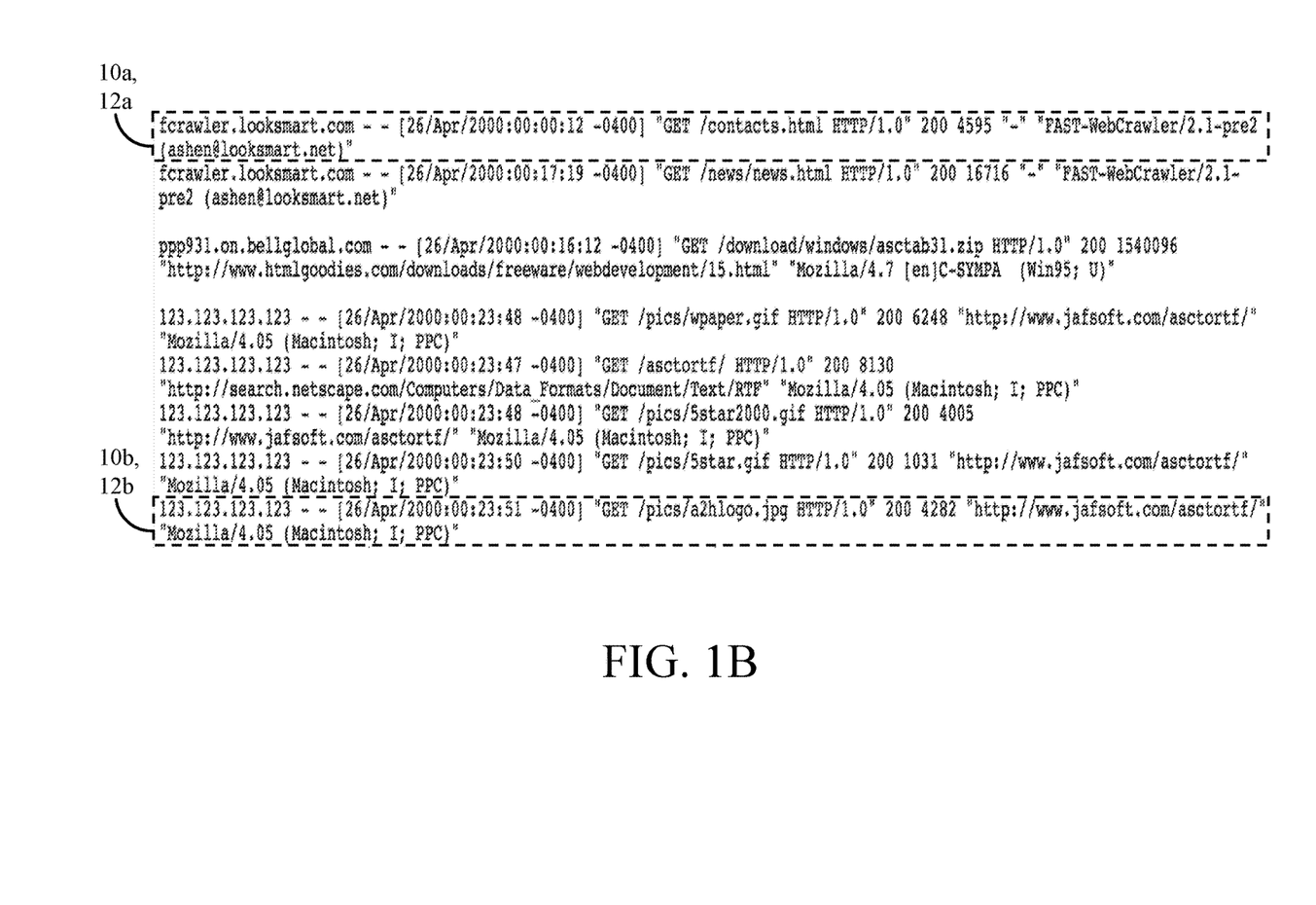
FIG. 1B depicts an example of the access records 10a, ..., 10b.

For ease of understanding, please refer an example of the access records 10a, . . . , 10b illustrated in FIG. 1B. In this example, the access record 10a comprises a network address (i.e., fcrawler.looksmart.com), an HTTP request (i.e., GET/contacts.html), an access status code (i.e., 200, which represents a successful access), and a data access amount (i.e., 4,595 bytes). The access record 10b comprises a network address (i.e., 123.123.123.123), an HTTP request (i.e., GET/pics/a2hlogo.jpg), an access status code (i.e., 200, which represents a successful access), and a data access amount (i.e., 4,282 bytes). It shall be appreciated that the access records 10a, . . . , 10b depicted in FIG. 1B are provided only for purpose of illustration but not to limit the scope of the present invention.

The processing unit 13 filters the access records 10a, . . . , 10b into a plurality of filtered access records 12a, . . . , 12b according to a predetermined rule (not shown). The access content of each of the filtered access records 12a, . . . , 12b conforms to the predetermined rule. In other words, regarding the access records 10a, . . . , 10b, the processing unit 13 excludes the one(s) whose access content does not conform to the predetermined rule. It shall be appreciated that the attacking node detection apparatus 1 may set different predetermined rules depending on different application requirements and the predetermined rule may be related to the type of the access content.

For example, when the access content of the access records 10a, . . . , 10b comprises an HTTP request, the processing unit 13 may set the predetermined rule to be that the HTTP request uses at least one illegal character. In this example, the primary consideration for deciding the predetermined rule in this way is that a hacker usually uses illegal characters in the Uniform Resource Locator (URLs) of the HTTP request to try various kinds of possible attacks. In this example, the access content of each of the filtered access records 12a, . . . , 12b uses illegal characters in the HTTP request. As another example, when the access content of the access records 10a, . . . , 10b comprises a data accessing amount, the processing unit 13 may set the predetermined rule to be that a data accessing amount is outside of a predetermined data amount range (e.g. the access data amount is outside of two standard deviations). In this example, the primary consideration for deciding the predetermined rule in this way is that the data access amount caused by a hacker attacking an application is usually much larger than the data access amount caused by a general user accessing the same application. In this example, the access content of each of the filtered access records 12a, . . . , 12b has the data accessing amount being outside of the predetermined data amount range.

Figure 1C:
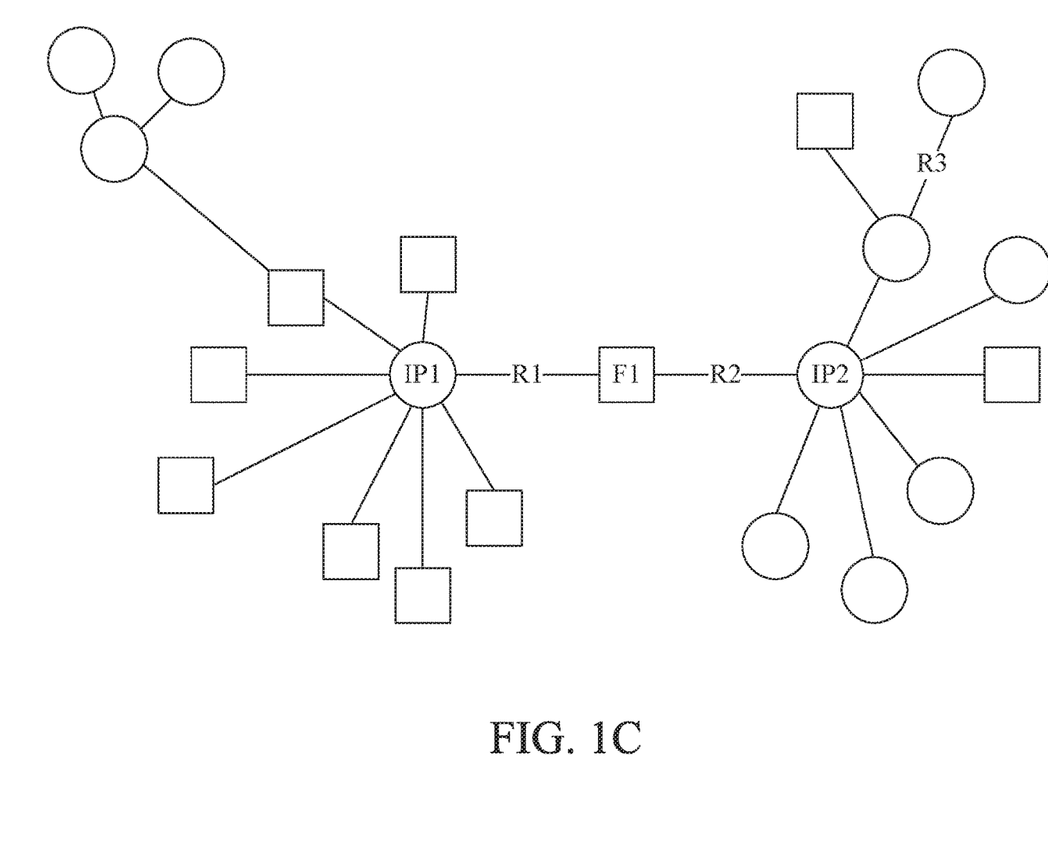
FIG. 1C illustrates the access relations R1, . . . , R2 in a graph.

Then, the processing unit 13 creates at least one access relation for each of the network addresses according to the filtered access records 12a, . . . , 12b, where each of the at least one access relation is defined by one of the network addresses and one of the access contents. Specifically, for each of the filtered access records 12a, . . . , 12b, the processing unit 13 generates at least one access relation between the network address and the access content recorded therein. For ease of understanding, it is assumed that the filtered access record 12a comprises a network address IP1 and an HTTP request and the HTTP request requests access of a file F1 of the application. In this case, the processing unit 13 creates an access relation R1 between the network address IP1 and the file F1 (i.e., records that there is a relation between the network address IP1 and the file F1) as shown in FIG. 1C. It is also assumed that the filtered access record 12b comprises a network address IP2 and a HTTP request, wherein the HTTP request requests access of a file F1 of the application. In this case, the processing unit 13 creates an access relation R2 between the network address IP2 and the file F1 (i.e., records that there is a relation between the network address IP2 and the file F1) as shown in FIG. 1C.

FIG. 1C depicts the access relations R1, ..., R2 created by the processing unit 13 according to the filtered access records 12a, ..., 12b in a graph. In FIG. 1C, each circle represents a network address, wherein the network addresses represented by the circles are different. Additionally, each square in FIG. 1C represents a file, wherein the files represented by the squares are different. It shall be appreciated that the way for representing the access relations R1, ..., R2 in FIG. 1C is only for the purpose of illustration but not to limit the present invention.

It shall be appreciated that, in some embodiments, the access content of a filtered access record may comprise more than one kind of information (e.g., any combination of the HTTP request, the access status code, and the data access amount). In these embodiments, for each of the filtered access records, the processing unit 13 generates an access relation between the network address and each kind of information comprised in the access content individually. For example, if a certain filtered access record comprises a network address and an access content comprising both an access status code and a data access amount, the processing unit 13 creates an access relation between the network address and the access status code as well as an access relation between the network address and the data access amount. In these embodiments, when the processing unit 13 enables a display screen to shown the access relations in a graph, different kinds of information may be represented by different geometric shapes (e.g. a square representing a file, a triangle representing a data access amount, and a diamond representing an access status code).

Afterwards, the processing unit 13 identifies a specific network address among the network addresses as a first attacking node according to the access relations R1, ..., R2. It shall be appreciated that the first attacking node may be viewed as an attacking entry point where the hacker may attack the application.

In some embodiments, the processing unit 13 determines whether the number of access relations of each network address is greater than a first predetermined threshold. If the number of the access relations of a network address is greater than the first predetermined threshold, the processing unit 13 treats the network address as the specific network address and takes the specific network address as the first attacking node. In some embodiments, if the access relations created by the processing unit 13 are of more than one kind (e.g., including access relations between network addresses and files, access relations between different network addresses, and access relations between network addresses and data access amounts), the processing unit 13 determines whether the number of access relations of a certain kind (e.g., access relations between network addresses and files) for each network address is greater than a first predetermined threshold. If the number of a certain kind of access relations of a network address is greater than the first predetermined threshold, the processing unit 13 treats the network address as the specific network address and takes the specific network address as the first attacking node. Taking FIG. 1C as an example, the processing unit 13 determines that the number of a certain kind (i.e., access relations between network addresses and files) of access relations of the network address IP1 is greater than a first predetermined threshold, so the network address IP1 is identified as the first attacking node.

In some embodiments, the processing unit 13 identifies the specific network address among the network addresses according to a Singular Value Decomposition (SVD) algorithm and an Outlier Detection algorithm and takes the specific network address as the first attacking node. Specifically, the processing unit 13 creates an access information matrix according to the network addresses and the access contents recorded in each of the access relations R1, ..., R2 (e.g., there are five different network addresses in the access relations R1, ..., R2, the processing unit 13 generates a 5×5 matrix, and the values of the elements of the matrix are determined by the access contents of the corresponding network addresses), transforms the access information matrix from a first space into a second space according to the SVD algorithm, and then identifies the outlier network address that is more deviated from others according to the outlier detection algorithm in the second space. The outlier network address detected by the processing unit 13 is the first attacking node. A person of ordinary skill in the art should be familiar with the operations performed by the SVD algorithm and the outlier detection algorithm, so the details will not be further described herein.

In some embodiments, the processing unit 13 may further detect the second attacking nodes according to the first attacking node (i.e., detecting other attacking entry points where the hacker may attack the application).

Figure 1D:
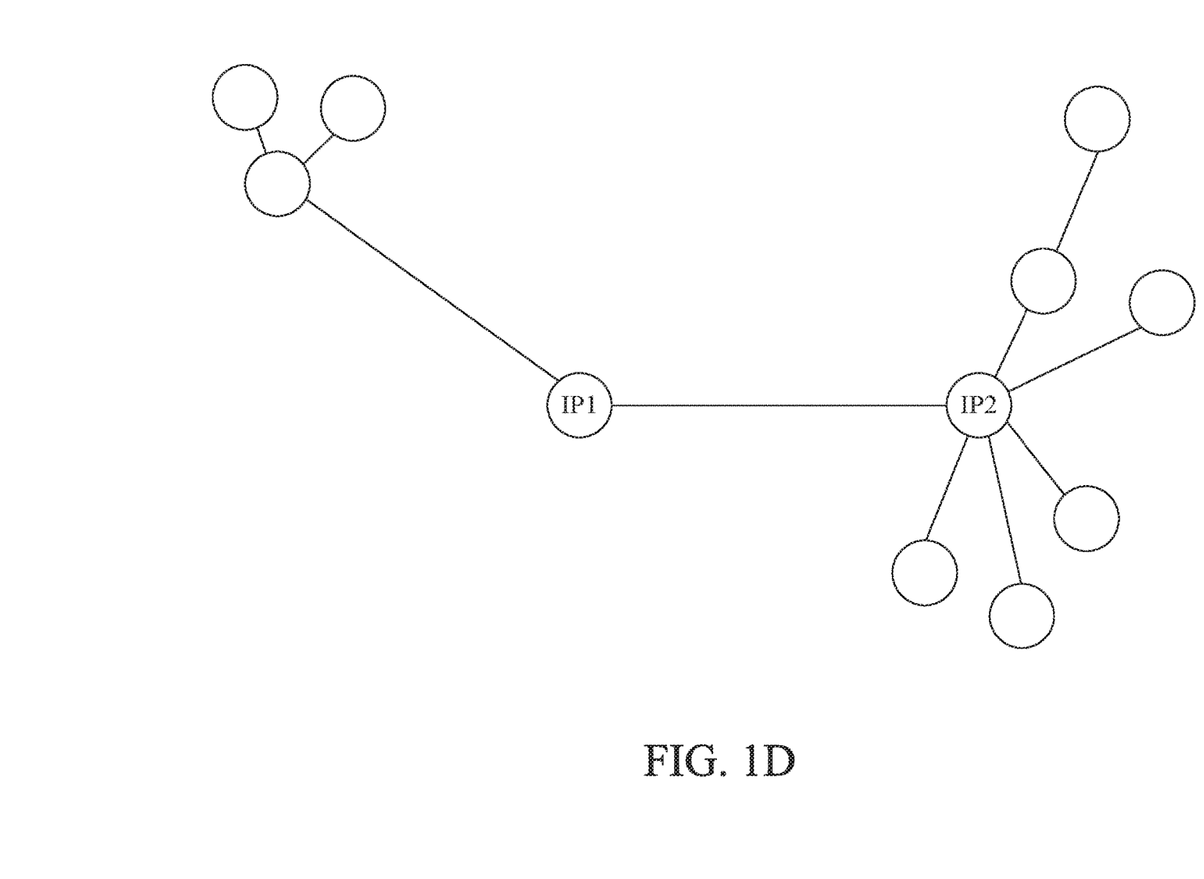
FIG. 1D illustrates the node relations in a graph.

Specifically, the processing unit 13 determines at least one node relation of each of the network addresses according to the access relations R1, ..., R2, wherein each of the at least one node relation is defined by two network addresses. For ease of understanding, please refer to FIG. 1C. The node relations determined by the processing unit 13 according to the access relations R1, ..., R2 may be classified into two kinds. The first kind of node relations includes the access relations (among the access relations R1, ..., R2) which are defined by two network addresses (e.g., the access relation R3 depicted in FIG. 1C). The second kind of node relations are established between network addresses whose access contents have common characteristics. Taking FIG. 1C as an example, the access content of the network address IP1 and the access content of the network address IP2 have common characteristics (i.e., both the access contents corresponding to the network addresses IP1, IP2 comprise the file F1) and, hence, the processing unit 13 creates a node relation between the network address IP1 and the network address IP2. FIG. 1D uses a graph to depict the node relations generated by the processing unit 13 according to the access relations R1, ..., R2 depicted in FIG. 1C, where each circle represents a network address and the network addresses represented by the circles are different. It shall be appreciated that the content depicted in FIG. 1D is only for purpose of illustration but not to limit the present invention.

Next, the processing unit 13 assigns an initial score (e.g., a predetermined score) to the first attacking node. The processing unit 13 then propagates the initial score according to a propagation algorithm and the node relations so that each of the network address has a propagated score. The propagation algorithm may be a PageRank algorithm, a Random Walk with Restart (RWR) algorithm, a TrustRank algorithm, or some other algorithm having the similar function.

Figure 1E:
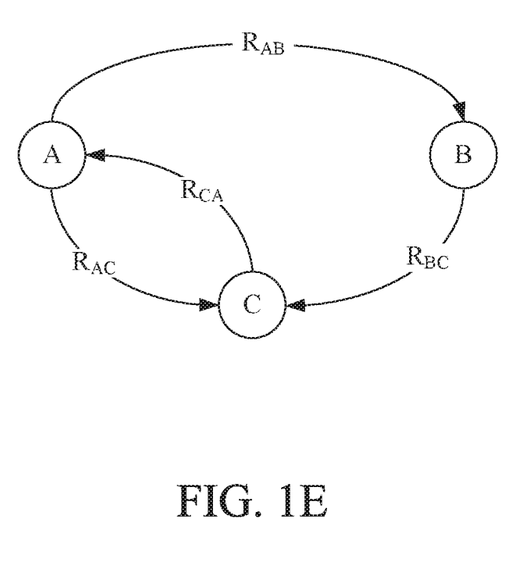
FIG. 1E illustrates the concept for propagating an initial score according to a propagation algorithm and based on the node relations.

For ease of understanding, an example shown in FIG. 1E is used for describing how the initial score is propagated according to the PageRank algorithm and the node relations. FIG. 1E depicts three network addresses A, B, C and the node relations $R_{AB}$, $R_{BC}$, $R_{CA}$, $R_A$. According to the PageRank algorithm, the edges (i.e. the node relations $R_{AB}$, $R_{BC}$, $R_{CA}$, $R_{AC}$) connecting between different nodes (i.e. the network addresses A, B, C) have directions. Hence, the processing unit 13 must determine the directions of the node relations $R_{AB}$, $R_{BC}$, $R_{CA}$, $R_{AC}$ before propagating the initial score. In some embodiments, the processing unit 13 determines the direction of a node relation according to the number of access relations of each of the two network addresses defining the node relation. For example, the direction of a node relation may be pointing from the network address having a smaller number of access relations to the network address having a larger number of access relations. If each of the access relations is between a network address and a file, a direction of a node relation determined by the aforesaid way points from a network node accessing a smaller number of files to a network node accessing a larger number of files.

In FIG. 1E, the node relation $R_{AB}$ points from the network address A to the network address B, the node relation $R_{BC}$ points from the network address B to the network address C, the node relation $R_{CA}$ points from the network address C to the network address A, and the node relation $R_{AC}$ points from the network address A to the network address C. The node relation $R_{AB}$ may be viewed as an outgoing link of the network address A as well as an incoming link of the network address B. Likewise, the node relation $R_{BC}$ may be viewed as an outgoing link of the network address B as well as an incoming link of the network address C. The node relation $R_{CA}$ may be viewed as an outgoing link of the network address C as well as an incoming link of the network address A. The node relation $R_{AC}$ may be viewed as an outgoing link of the network address A as well as an incoming link of the network address C.

The processing unit 13 may propagate the initial score from the first attacking node once the directions of the node relations $R_{AB}$, $R_{BC}$, $R_{CA}$, $R_{AC}$ are decided. It is assumed that the network address A is the first attacking node. The processing unit 13 assigns an initial score (e.g., a predetermined score) to the network address A and then propagates the initial score of the network address A according to the following Equation (1) (i.e. an equation provided by the PageRank algorithm) so that each of the network addresses A, B, C has a propagated score. The propagated scores of the network A, B, C are calculated repeatedly by the processing unit 13 according to Equation (1) until they converge.

$$PR(u) = \sum_{v \in B_u} \frac{PR(v)}{L_v} \quad (1)$$

In Equation (1), the variable u may be any of the network addresses A, B, C, PR(u) represents the propagated score of the network address represented by the variable u, PR(v) represents the propagated score of the network address represented by the variable v, the parameter $B_u$ represents a set formed by the network addresses that points to the network address represented by the variable u (e.g., if the variable u represents the network address C, the set formed by $B_u$ includes the network address A and the network address B), and the parameter $L_v$ is the number of outgoing links of the network address represented by the variable v.

In some embodiments, the processing unit 13 may also propagate the initial score of the network address A according to the following Equation (2) (i.e., another equation provided by the PageRank algorithm) so that each of the network addresses A, B, C has a propagated score. The propagated scores of the network A, B, C are calculated repeatedly by the processing unit 13 according to Equation (2) until they converge.

$$PR(u) = \frac{\lambda}{N} + (1 - \lambda) \sum_{v \in B_u} \frac{PR(v)}{L_v} \quad (2)$$

In Equation (2), the variable u may be any of the network addresses A, B, C, PR(u) represents the propagated score of the network address represented by the variable u, PR(v) represents the propagated score of the network address represented by the variable v, the parameter $B_u$ represents a set formed by the network addresses that points to the network address represented by the variable u (e.g., if the variable u represents the network address C, the set formed by $B_u$ includes the network address A and the network address B), the parameter $L_v$ is the number of outgoing links of the network address represented by the variable v, the variable $\lambda$ represents the probability of randomly linking to a node, and the variable N represents the number of network addresses.

According to the above descriptions, a person of ordinary skill in the art should be able to know how the processing unit 13 calculates the propagated scores of network addresses based on the RWR algorithm, the TrustRank algorithm, or some other algorithm having the similar function. Therefore, the details will not be further described herein.

The processing unit 13 selects at least one second attacking node from the network addresses after the processing unit 13 propagates the initial score of the first attacking node to other network addresses according to a propagation algorithm and the node relations. It shall be appreciated that the second attacking node(s) selected by the processing unit 13 has/have the propagated score(s) greater than a second predetermined threshold. It shall be appreciated that the second attacking nodes may be viewed as attacking entry points where the hacker may attack the application.

According to the above descriptions, the attacking node detection apparatus 1 utilizes a plurality of access records 10a, . . . , 10b (i.e., access records regarding other hosts access the application) to detect attacking entry points where the hacker may attack the application. Briefly speaking, the attacking node detection apparatus 1 detects the network addresses that have abnormal behaviors (e.g., the number of access relations of a network address being greater than the first predetermined threshold) by analyzing the access records 10a, . . . , 10b and identifies the network addresses that have abnormal behaviors as the first attacking nodes. Moreover, the attacking node detection apparatus 1 identifies other nodes having behaviors similar to the first attacking nodes as the second attacking nodes. Through the aforesaid operations, the attacking node detection apparatus 1 can find out not only the highly-possible attacking nodes but also the potential attacking nodes. These attacking nodes are attacking entry points where hackers may attack the application.

Figure 2:
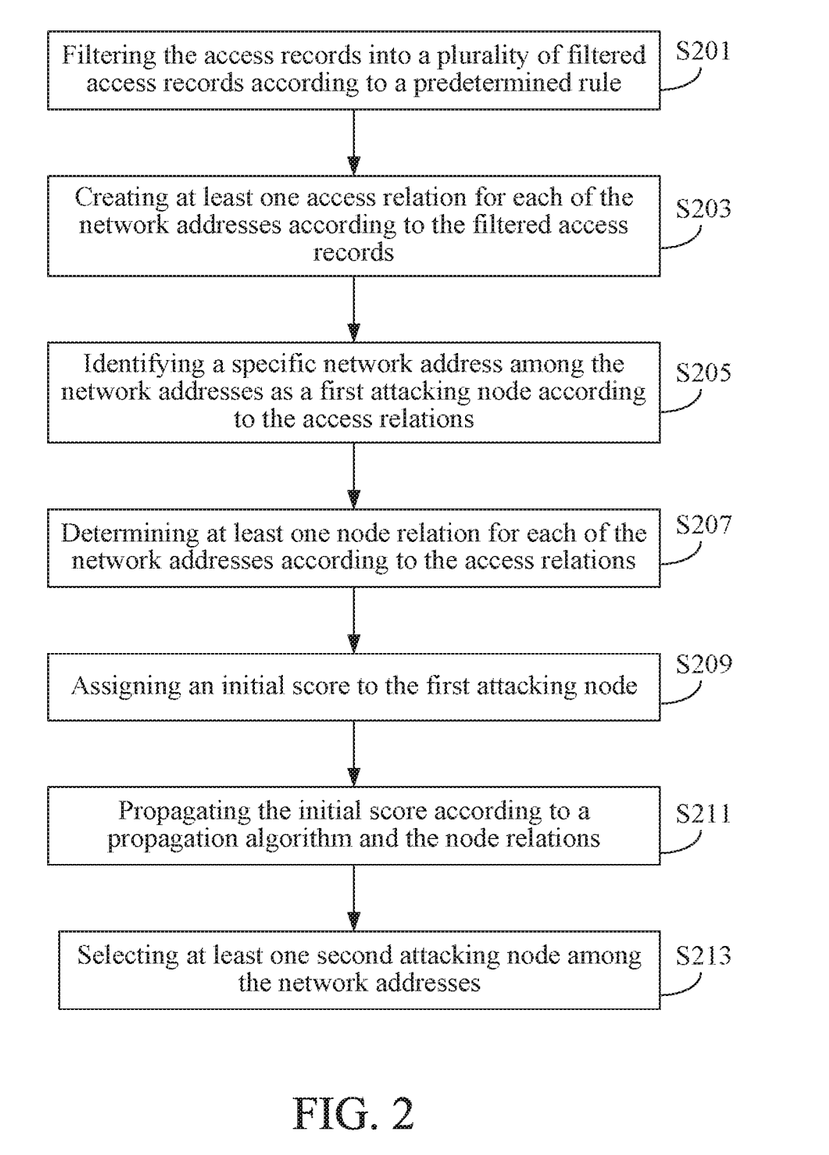
FIG. 2 is a flowchart of an attacking node detection method of the second embodiment.

A second embodiment of the present invention is an attacking node detection method and a flowchart of which is depicted in FIG. 2. The attacking node detection method is adapted for an electronic computing apparatus (e.g., the attacking node detection apparatus 1 of the first embodiment). The electronic computing apparatus stores a plurality of access records of an application, where each of the access records comprises a network address of a host and an access content regarding the host accessing the application. In some embodiments, each of the access contents is an HTTP request, a status code, and/or a data access amount.

In step S201, the electronic computing apparatus filters the access records into a plurality of filtered access records according to a predetermined rule. It is noted that the access content of each of the filtered access records conforms to the predetermined rule. For example, when the access contents of the access records comprise an HTTP request, the predetermined rule may be that an HTTP request uses at least one illegal character. In this case, the access contents of the filtered access records obtained in the step S201 use illegal characters in the HTTP requests. As another example, when the access contents of the access records 10a, . . . , 10b comprise a data accessing amount, the predetermined rule may be that a data accessing amount is outside of a predetermined data amount range. In this case, the access contents of the filtered access records 12a, . . . , 12b obtained in the step S201 are outside of a predetermined data amount range.

In step S203, the electronic computing apparatus creates at least one access relation for each of the network addresses according to the filtered access records, wherein each of the access relations is defined by one of the network addresses and one of the access contents. Specifically, for each of the filtered access records, the step S203 generates at least one access relation between the network address and the access content recorded therein.

In step S205, the electronic computing apparatus identifies a specific network address among the network addresses as a first attacking node according to the access relations. It shall be appreciated that the first attacking nodes may be viewed as attacking entry points where hackers may attack the application. In some embodiments, the step S205 identifies the specific network address among the network addresses by determining that the number of the at least one access relations of the specific network address is greater than a predetermined threshold. In some embodiments, the step S205 identifies the specific network address among the network addresses according to an SVD algorithm and an outlier detection algorithm.

In step S207, the electronic computing apparatus determines at least one node relation of each of the network addresses according to the access relations, where each of the node relations is defined by two of the network addresses. In step S209, the electronic computing apparatus assigns an initial score to the first attacking node. In step S211, the electronic computing apparatus propagates the initial score according to a propagation algorithm and the node relations so that each of the network addresses has a propagated score. The propagation algorithm may be one of a PageRank algorithm, an RWR algorithm, and a TrustRank algorithm. In step S213, the electronic computing apparatus selects at least one second attacking node among the network addresses. It is noted that the propagated score of each of the at least one second attacking node is greater than a predetermined threshold. It shall be appreciated that the second attacking nodes may be viewed as attacking entry points where hackers may attack the application.

In addition to the aforesaid steps, the second embodiment can also execute all the operations and steps of, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The attacking node detection method described in the second embodiment may be implemented by a computer program comprising a plurality of codes. The computer program is stored in a non-transitory computer readable storage medium. When the computer program is loaded into an electronic computing apparatus (e.g., the attacking node detection apparatus 1), the computer program executes the attacking node detection method described in the second embodiment is executed. The non-transitory computer readable storage medium may be an electronic product, e.g., a read only memory (ROM), a flash memory, a floppy disk, a hard disk, a compact disk (CD), a mobile disk, a magnetic tape, a database accessible to a network or any other storage medium known to those of ordinary skill in the art and having the same functionality.

It shall be appreciated that in the specification and the claims of the present invention, the terms "first" and "second" used in the first attacking node and the second attacking node are only intended to represent that the attacking nodes are determined in different stages. The terms "first" and "second" used in the first predetermined threshold and the second predetermined threshold are only intended to represent that they are different thresholds.

According to the above descriptions, the attacking node detection technology (including the apparatus, method, and non-transitory computer readable storage medium thereof) provided in the present invention detects the network addresses that have abnormal behaviors (e.g., the number of access relations of a network address being greater than the first predetermined threshold) by analyzing a plurality of access records of an application and identifies the network addresses that have abnormal behaviors as the first attacking nodes. Moreover, the attacking node detection technology (including the apparatus, method, and non-transitory computer readable storage medium thereof) provided in the present invention identifies other nodes having behaviors similar to the first attacking nodes as the second attacking nodes. Through the aforesaid operations, the attacking node detection technology (including the apparatus, method, and non-transitory computer readable storage medium thereof) provided in the present invention can find not only the highly-possible attacking nodes but also the potential attacking nodes. These attacking nodes are attacking entry points where hackers may attack the application.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An attacking node detection apparatus, comprising:
   a storage unit, storing a plurality of access records of an application, wherein each of the access records comprises a network address of a host and an access content regarding the host accessing the application; and
   a processing unit, being electrically connected to the storage unit and configured to filter the access records into a plurality of filtered access records according to a predetermined rule, wherein the access content of each of the filtered access records conforms to the predetermined rule;
   wherein the processing unit further creates at least one access relation for each of the network addresses according to the filtered access records, each of the access relations is defined by one of the network addresses and one of the access contents, wherein the processing unit further identifies a specific network address among the network addresses as a first attacking node according to the access relations;

wherein the processing unit further determines at least one node relation for each of the network addresses according to the access relations, each of the node relations is defined by two of the network addresses, the processing unit further assigns an initial score to the first attacking node, the processing unit further propagates the initial score according to a propagation algorithm and the node relations so that each of the network addresses has a propagated score, the processing unit further selects at least one second attacking node among the network addresses, and the propagated score of each of the at least one second attacking node is greater than a predetermined threshold.

2. The attacking node detection apparatus of claim 1, wherein each of the access contents is one of a HyperText Transfer Protocol (HTTP) request, a status code, a data access amount, and a combination thereof.

3. The attacking node detection apparatus of claim 1, wherein the predetermined rule is that an HTTP request uses at least one illegal character.

4. The attacking node detection apparatus of claim 1, wherein the predetermined rule is that a data access amount is outside of a predetermined data amount range.

5. The attacking node detection apparatus of claim 1, wherein the processing unit identifies the specific network address among the network addresses by determining that the number of the at least one access relations of the specific network address is greater than a predetermined threshold.

6. The attacking node detection apparatus of claim 1, wherein the processing unit identifies the specific network address among the network addresses according to a singular value decomposition (SVD) algorithm and an outlier detection algorithm.

7. The attacking node detection apparatus of claim 1, wherein the propagation algorithm is one of a PageRank algorithm, a Random Walk with Restart (RWR) algorithm, and a TrustRank algorithm.

8. An attacking node detection method, being adapted for an electronic computing apparatus, the electronic computing apparatus storing a plurality of access records of an application, each of the access records comprising a network address of a host and an access content regarding the host accessing the application, and the attacking node detection method comprising:
    (a) filtering the access records into a plurality of filtered access records according to a predetermined rule, wherein the access content of each of the filtered access records conforms to the predetermined rule;
    (b) creating at least one access relation for each of the network addresses according to the filtered access records, wherein each of the access relations is defined by one of the network addresses and one of the access contents;
    (c) identifying a specific network address among the network addresses as a first attacking node according to the access relations;
    (d) determining at least one node relation of each of the network addresses according to the access relations, wherein each of the node relations is defined by two of the network addresses;
    (e) assigning an initial score to the first attacking node;
    (f) propagating the initial score according to a propagation algorithm and the node relations so that each of the network addresses has a propagated score; and
    (g) selecting at least one second attacking node among the network addresses, wherein the propagated score of each of the at least one second attacking node is greater than a predetermined threshold.

9. The attacking node detection method of claim 8, wherein each of the access contents is one of a HyperText Transfer Protocol (HTTP) request, a status code, a data access amount, and a combination thereof.

10. The attacking node detection method of claim 8, wherein the predetermined rule is that an HTTP request uses at least one illegal character.

11. The attacking node detection method of claim 8, wherein the predetermined rule is that a data access amount is outside of a predetermined data amount range.

12. The attacking node detection method of claim 8, wherein the step (c) identifies the specific network address among the network addresses by determining that the number of the at least one access relations of the specific network address is greater than a predetermined threshold.

13. The attacking node detection method of claim 8, wherein the step (c) identifies the specific network address among the network addresses according to a singular value decomposition (SVD) algorithm and an outlier detection algorithm.

14. The attacking node detection method of claim 8, wherein the propagation algorithm is one of a PageRank algorithm, a Random Walk with Restart (RWR) algorithm, and a TrustRank algorithm.

15. A non-transitory computer readable storage medium, having a computer program stored therein, the computer program executing an attacking node detection method after being loaded into an electronic computing apparatus, the electronic computing apparatus storing a plurality of access records of an application, each of the access records comprising a network address of a host and an access content regarding the host accessing the application, and the attacking node detection method comprising:
    (a) filtering the access records into a plurality of filtered access records according to a predetermined rule, wherein the access content of each of the filtered access records conforms to the predetermined rule;
    (b) creating at least one access relation for each of the network addresses according to the filtered access records, wherein each of the access relations is defined by one of the network addresses and one of the access contents;
    (c) identifying a specific network address among the network addresses as a first attacking node according to the access relations;
    (d) determining at least one node relation of each of the network addresses according to the access relations, wherein each of the node relations is defined by two of the network addresses;
    (e) assigning an initial score to the first attacking node;
    (f) propagating the initial score according to a propagation algorithm and the node relations so that each of the network addresses has a propagated score; and
    (g) selecting at least one second attacking node among the network addresses, wherein the propagated score of each of the at least one second attacking node is greater than a predetermined threshold.

16. The non-transitory computer readable storage medium of claim 15, wherein the step (c) identifies the specific network address among the network addresses by determining that the number of the at least one access relations of the specific network address is greater than a predetermined threshold.

17. The non-transitory computer readable storage medium of claim 15, wherein the step (c) identifies the specific network address among the network addresses according to a singular value decomposition (SVD) algorithm and an outlier detection algorithm.

\* \* \* \* \*